(12) United States Patent
Tanigaki et al.

(10) Patent No.: US 9,305,724 B2
(45) Date of Patent: Apr. 5, 2016

(54) CIRCUIT BREAKER

(75) Inventors: Shuichi Tanigaki, Tokyo (JP); Daisuke Yoshida, Tokyo (JP); Tomohito Mori, Tokyo (JP)

(73) Assignee: MITSUBISHI ELECTRIC CORPORATION, Chiyoda-Tokyo (JP)

( * ) Notice: Subject to any disclaimer, the term of this patent is extended or adjusted under 35 U.S.C. 154(b) by 0 days.

(21) Appl. No.: 14/343,295

(22) PCT Filed: Sep. 20, 2011

(86) PCT No.: PCT/JP2011/071337
§ 371 (c)(1),
(2), (4) Date: Mar. 6, 2014

(87) PCT Pub. No.: WO2013/042183
PCT Pub. Date: Mar. 28, 2013

(65) Prior Publication Data
US 2014/0224772 A1   Aug. 14, 2014

(51) Int. Cl.
*H01H 33/08* (2006.01)
*H02B 13/035* (2006.01)
*H01H 33/70* (2006.01)

(52) U.S. Cl.
CPC ............. *H01H 33/08* (2013.01); *H02B 13/035* (2013.01); *H01H 33/70* (2013.01)

(58) Field of Classification Search
CPC ........... H01H 9/38; H01H 9/40; H01H 33/66; H01H 9/30
USPC .................................. 218/7, 12, 13, 153, 154
See application file for complete search history.

(56) References Cited

U.S. PATENT DOCUMENTS

| 4,223,191 A | * | 9/1980 | Calvino | ............... H01H 33/14 218/4 |
| 4,293,747 A | * | 10/1981 | Perulfi | ............................ 218/4 |

(Continued)

FOREIGN PATENT DOCUMENTS

| CN | 101436486 A | 5/2009 |
| JP | 51-016474 A | 2/1976 |

(Continued)

OTHER PUBLICATIONS

International Search Report (PCT/ISA/210) mailed on Nov. 1, 2011, by the Japanese Patent Office as the International Searching Authority for International Application No. PCT/JP2011/071337.

(Continued)

*Primary Examiner* — Truc Nguyen
(74) *Attorney, Agent, or Firm* — Buchanan Ingersoll & Rooney PC

(57) ABSTRACT

A circuit breaker includes: a first arc-extinguishing chamber and a second arc-extinguishing chamber that interrupt a current by opening contact points and extinguish an arc during the current is being interrupted; and a connection unit that connects the first arc-extinguishing chamber and the second arc-extinguishing chamber to each other. The first arc-extinguishing chamber and the second arc-extinguishing chamber are connected to the connection unit in such a manner that shaft lines of the arc-extinguishing chambers form an angle of substantially 90 degrees. The first arc-extinguishing chamber is arranged on a side of the connection unit in such a manner that the shaft line thereof is substantially horizontal, and the second arc-extinguishing chamber is arranged on an upper side of the connection unit in such a manner that the shaft line thereof is substantially vertical.

5 Claims, 4 Drawing Sheets

(56) References Cited

U.S. PATENT DOCUMENTS

| | | | | | |
|---|---|---|---|---|---|
| 4,307,273 | A | * | 12/1981 | Sasaki | H01H 33/14 218/123 |
| 4,315,119 | A | * | 2/1982 | Kishi | H01H 33/42 218/4 |
| 4,383,150 | A | * | 5/1983 | Cromer | H01H 33/167 218/145 |
| 4,486,633 | A | * | 12/1984 | Calvino | H01H 33/008 218/43 |
| 4,510,359 | A | * | 4/1985 | de Calvino y Teijeiro | H01H 33/166 218/143 |
| 4,570,202 | A | | 2/1986 | Nishida et al. | |
| 7,750,264 | B2 | | 7/2010 | Laskowski et al. | |
| 2002/0056704 | A1 | | 5/2002 | Furuta et al. | |
| 2007/0151953 | A1 | | 7/2007 | Meinherz | |
| 2008/0203062 | A1 | * | 8/2008 | Sato | H01H 33/24 218/134 |
| 2009/0120907 | A1 | * | 5/2009 | Girodet et al. | 218/5 |

FOREIGN PATENT DOCUMENTS

| | | |
|---|---|---|
| JP | 58-42117 A | 3/1983 |
| JP | 58-069414 A | 4/1983 |
| JP | 63-018813 B2 | 4/1988 |
| JP | 64-003147 Y2 | 1/1989 |
| JP | 03-020961 B2 | 3/1991 |
| JP | 03-222610 A | 10/1991 |
| JP | 10-098808 A | 4/1998 |
| JP | 2002-051415 A | 2/2002 |
| JP | 2002-150899 A | 5/2002 |
| JP | 2007-520183 A | 7/2007 |
| JP | 2008-511952 A | 4/2008 |
| JP | 2010-081759 A | 4/2010 |
| WO | WO 2005/074086 A1 | 8/2005 |
| WO | WO 2006/024586 A1 | 3/2006 |

OTHER PUBLICATIONS

Written Opinion (PCT/ISA/237) mailed on Nov. 1, 2011, by the Japanese Patent Office as the International Searching Authority for International Application No. PCT/JP2011/071337.

Office Action issued on May 4, 2015, by the Chinese Patent Office in corresponding Chinese Patent Application No. 201180073560.4, and an English Translation of the Office Action. (15 pages).

Chinese Office Action dated Dec. 23, 2015 issued in corresponding Chinese Patent Appln. No. 2011800735604, with English translation (12 pages).

* cited by examiner

CIRCUIT BREAKER

FIELD

The present invention relates to a double-break circuit breaker.

BACKGROUND

Conventionally, a circuit breaker that is installed in an electrical power stations such as a substation and a switching station to interrupt a current has been used. In some cases, a double-break circuit breaker having two arc-extinguishing chambers that extinguish an arc occurring between contact makers and interrupt a current is used as the circuit breaker. The circuit breaker having two arc-extinguishing chambers is also referred to as "double-break circuit breaker" in the following explanations. The double-break circuit breaker has an advantage such that an operation force required at the time of interrupting a current is smaller than that of a single-break circuit breaker.

In the double-break circuit breaker, a first arc-extinguishing chamber, connection conductors, and a second arc-extinguishing chamber are arranged horizontally in a line along a tank shaft center as described in Patent Literature 1, for example. A portion of the connection conductor is supported by an insulating support tube. An operation device for operating the circuit breaker is arranged under the insulating support tube.

Furthermore, Patent Literature 2 discloses a double-break circuit breaker in which two breaking units connected with a bracket are accommodated in one hermetic container. The bracket is supported by a support insulator, and an internal conductor has a V-shape as a whole.

CITATION LIST

Patent Literatures

Patent Literature 1: Japanese Patent Application Laid-open No. H3-222610
Patent Literature 2: Japanese Patent Application Laid-open No. S58-69414

SUMMARY

Technical Problem

However, according to the technique disclosed in Patent Literature 1 mentioned above, arc-extinguishing chambers are arranged in a line symmetrically to an operation device and conductors are provided to extend horizontally. Therefore, there is a problem that the size of the circuit breaker is increased in a horizontal direction. Due to the increased size of the circuit breaker in a horizontal direction, it is difficult to transport the circuit breaker to an installation site as it is. Accordingly, the circuit breaker needs to be transported in a disassembled state and to be assembled at the site, which may lead to increase in the manufacturing cost. Furthermore, there is a problem that the horizontally increased size reduces the flexibility of arrangement at the installation site.

Further, according to the technique disclosed in Patent Literature 2 mentioned above, the hermetic container becomes large because it accommodates therein two breaking units. Therefore, the manufacturing cost of the hermetic container is increased and the entire manufacturing cost of the circuit breaker is also increased. Further, more insulating gas to be filled in the hermetic container is required, resulting in further cost increase.

The present invention has been achieved in view of the above problems, and an object of the present invention is to provide a circuit breaker that can improve the flexibility of arrangement and suppress the manufacturing cost by suppressing increase in the size of the whole device.

Solution to Problem

To solve the above described problems and achieve the object, according to an aspect of the present invention a circuit breaker includes: a first arc-extinguishing chamber and a second arc-extinguishing chamber that interrupt a current by opening contact points and extinguish an arc during the current is being interrupted; and a connection unit that connects the first arc-extinguishing chamber and the second arc-extinguishing chamber to each other. The first arc-extinguishing chamber and the second arc-extinguishing chamber are connected to the connection unit in such a manner that shaft lines of the arc-extinguishing chambers form an angle of substantially 90 degrees.

Advantageous Effects of Invention

According to the present invention, a first arc-extinguishing chamber and a second arc-extinguishing chamber are connected to a connection unit in such a manner that shaft lines thereof form an angle of substantially 90 degrees. Therefore, increase in the size of the whole device can be suppressed, the flexibility of arrangement can be improved, and the manufacturing cost can be suppressed.

DESCRIPTION OF EMBODIMENTS

Exemplary embodiments of a circuit breaker according to the present invention will be explained below in detail with reference to the accompanying drawing. The present invention is not limited to the embodiments.

First Embodiment

Figure 1:
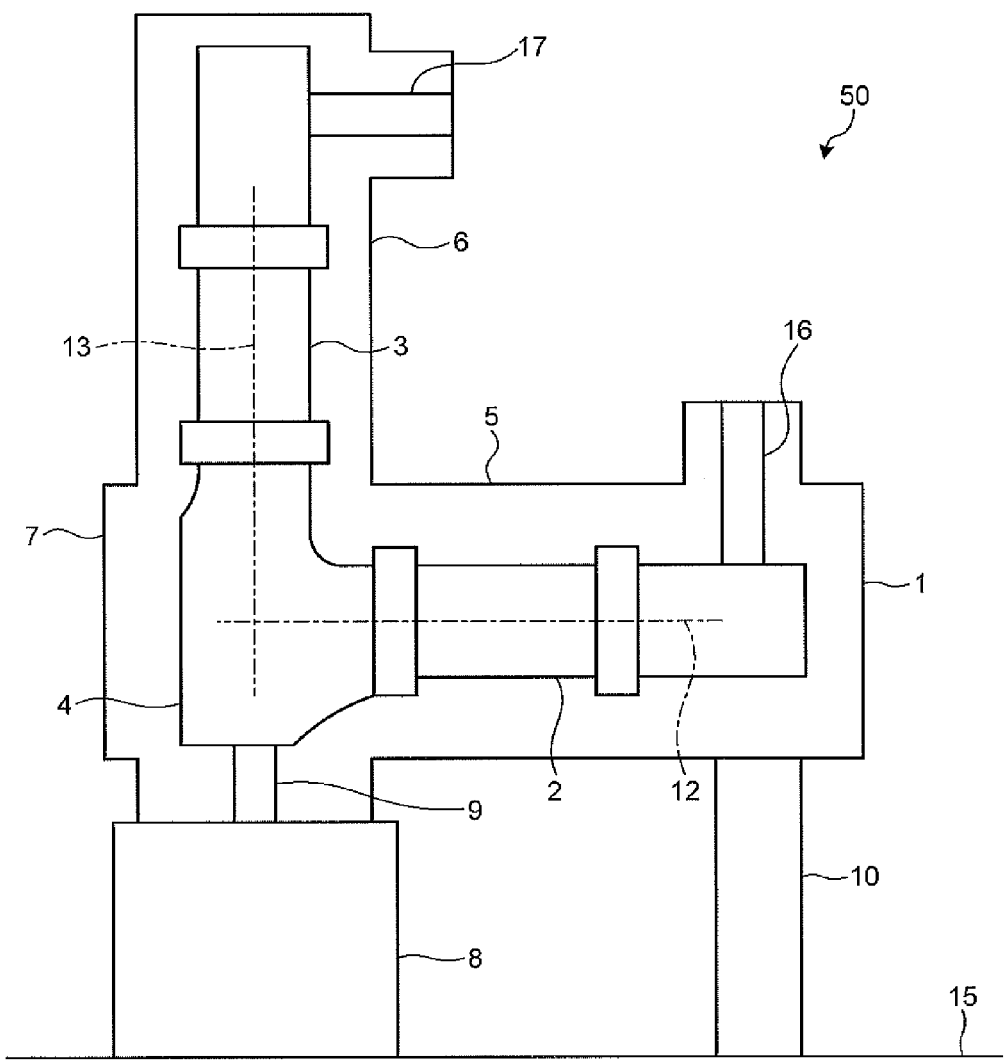
FIG. 1 is a front cross-sectional schematic diagram of a schematic configuration of the inside of a circuit breaker according to a first embodiment of the present invention.

FIG. 1 is a front view of a schematic configuration of a circuit breaker according to a first embodiment of the present invention. A circuit breaker 50 includes a hermetic tank 1 and an operation device 8. A first arc-extinguishing chamber 2, a second arc-extinguishing chamber 3, and a connection conductor (connection unit) 4 are accommodated in the inside of the hermetic tank 1. Internal configurations of the arc-extinguishing chambers 2 and 3 and an internal configuration of the operation device 8 are omitted in FIG. 1.

The hermetic tank 1 includes a first tank portion 5 that encloses a circumference of the first arc-extinguishing chamber 2, a second tank portion 6 that encloses a circumference of the second arc-extinguishing chamber 3, and a connection tank portion 7 that encloses a circumference of the connection conductor 4. The circuit breaker 50 is installed on an installation surface 15 with the hermetic tank 1 being supported by a tank support leg 10.

Arc extinguishing gas such as $SF_6$ (sulfur hexafluoride) is filled in the hermetic tank 1. The first arc-extinguishing chamber 2 and the second arc-extinguishing chamber 3 each includes a contact point (not shown) therein and interrupts a current in an electrical power station such as a substation or a switching station by opening the contact point. As described above, the circuit breaker 50 is a double-break circuit breaker including the two arc-extinguishing chambers 2 and 3. In each one of the arc-extinguishing chambers 2 and 3, when the contact point is opened, the arc extinguishing gas is sprayed to the contact point to extinguish an arc occurring at the contact.

The first arc-extinguishing chamber 2 and the second arc-extinguishing chamber 3 are connected to the connection conductor 4. The first arc-extinguishing chamber 2 is arranged on a side of the connection conductor 4 in such a manner that a shaft line 12 of the first arc-extinguishing chamber 2 is substantially horizontal (substantially parallel to the installation surface 15). The second arc-extinguishing chamber 3 is arranged on an upper side of the connection conductor 4 in such a manner that a shaft line 13 of the second arc-extinguishing chamber 3 is substantially vertical (substantially perpendicular to the installation surface 15). By arranging and connecting the arc-extinguishing chambers 2 and 3 as described above, the shaft line 12 of the first arc-extinguishing chamber 2 and the shaft line 13 of the second arc-extinguishing chamber 3 form an angle of substantially 90 degrees.

A conductor 16 is led out upward from the hermetic tank 1 and extends substantially parallel to the shaft line 13 of the second arc-extinguishing chamber 3; and extends from a side opposite to a side the first arc-extinguishing chamber 2 is connected to the connection conductor 4. A conductor 17 is led out from the hermetic tank 1 laterally to a side of the first arc-extinguishing chamber 2 and extends substantially parallel to the shaft line 12 of the first arc-extinguishing chamber 2; and extends from a side opposite to a side the second arc-extinguishing chamber 3 is connected to the connection conductor 4. By leading the conductors 16 and 17 out of the hermetic tank 1 as described above, the conductors 16 and 17 led out of the hermetic tank 1 are configured not to protrude from the circuit breaker 50 in a horizontal direction.

The operation device 8 is a device for performing an opening-closing operation of contact points of each one of the arc-extinguishing chambers 2 and 3. The operation device 8 is connected to the connection conductor 4. Each one of the contact points is connected to the operation device 8 via an insulating operation rod 9 so that the contact points of the arc-extinguishing chambers 2 and 3 can be simultaneously operated by a single operation device 8. The operation device 8 is arranged on a lower side of the connection conductor 4, that is, on the opposite side of the second arc-extinguishing chamber 3 sandwiching the connection conductor 4 therebetween.

By arranging one of the two arc-extinguishing chambers 2 and 3 on the upper side of the connection conductor 4 as explained above, size increase of the circuit breaker 50 in a horizontal direction can be suppressed. Accordingly, the flexibility in arrangement of the circuit breaker 50 in an electrical power station such as a substation or a switching station can be improved and also the manufacturing cost can be suppressed.

Furthermore, by arranging the operation device 8 on a lower side of the connection conductor 4, size increase of the circuit breaker 50 in a horizontal direction can be suppressed as compared to a case where the operation device 8 is arranged on a side of the connection conductor 4. Further, because the conductors 16 and 17 led out of the hermetic tank 1 are configured not to protrude from the circuit breaker 50 in a horizontal direction, size increase of the circuit breaker 50 in a horizontal direction can be further suppressed.

Second Embodiment

Figure 2:
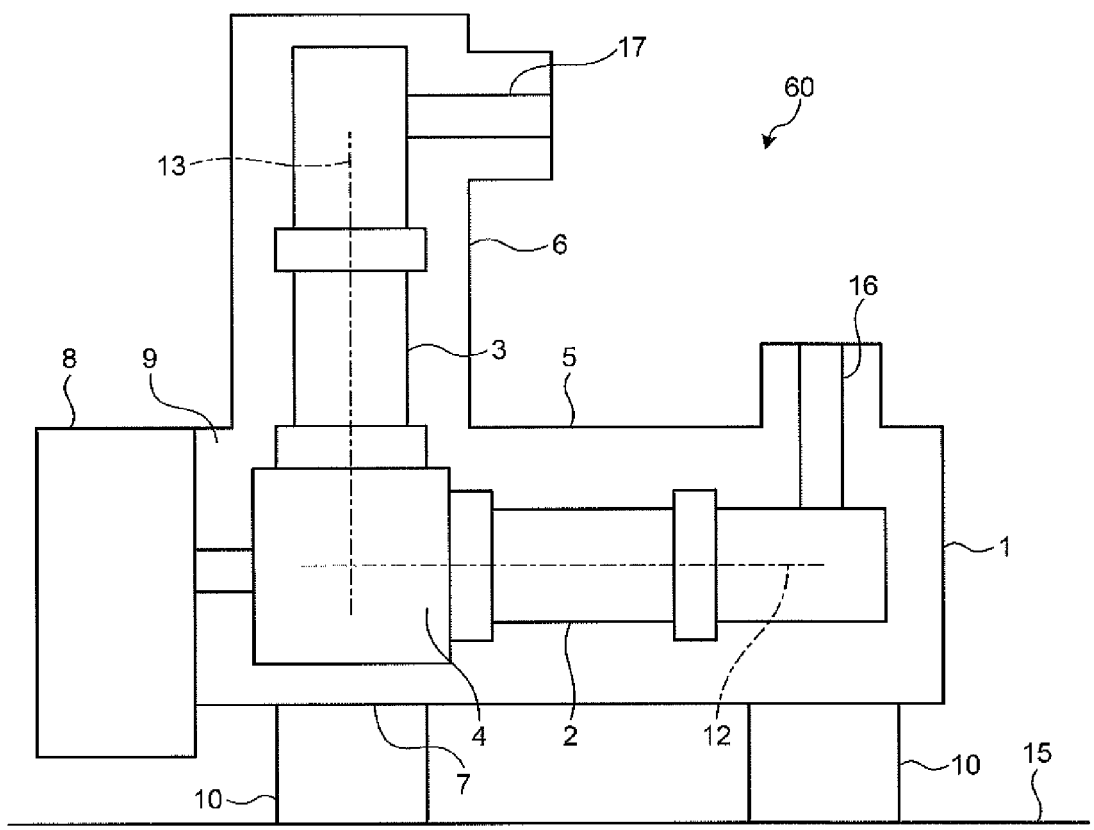
FIG. 2 is a front cross-sectional schematic diagram of a schematic configuration of the inside of a circuit breaker according to a second embodiment of the present invention.

FIG. 2 is a front view of a schematic configuration of a circuit breaker according to a second embodiment of the present invention. Internal configurations of the arc-extinguishing chambers 2 and 3 and an internal configuration of the operation device 8 are omitted in FIG. 2. Constituent elements identical to those of the embodiment described above are denoted by like reference signs and detailed explanations thereof will be omitted. In a circuit breaker 60 according to the second embodiment, the operation device 8 is arranged on a side of the connection conductor 4 and on the opposite side of the first arc-extinguishing chamber 2 sandwiching the connection conductor 4 therebetween.

By applying such an arrangement, while the circuit breaker 60 has a larger size in a horizontal direction as compared to the arrangement described in the first embodiment, the tank support leg 10 can be shortened, so that the circuit breaker 60 can be downsized in a vertical direction.

Third Embodiment

Figure 3:
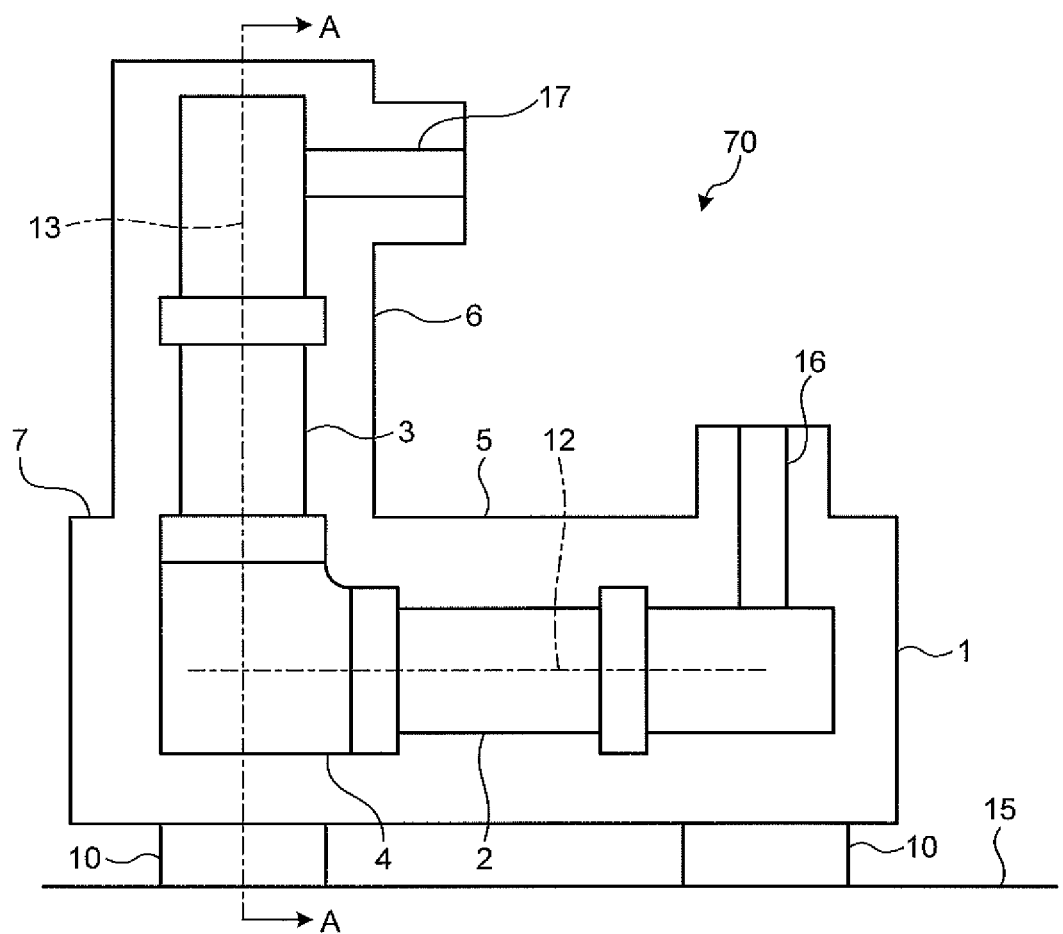
FIG. 3 is a front cross-sectional schematic diagram of a schematic configuration of the inside of a circuit breaker according to a third embodiment of the present invention.
Figure 4:
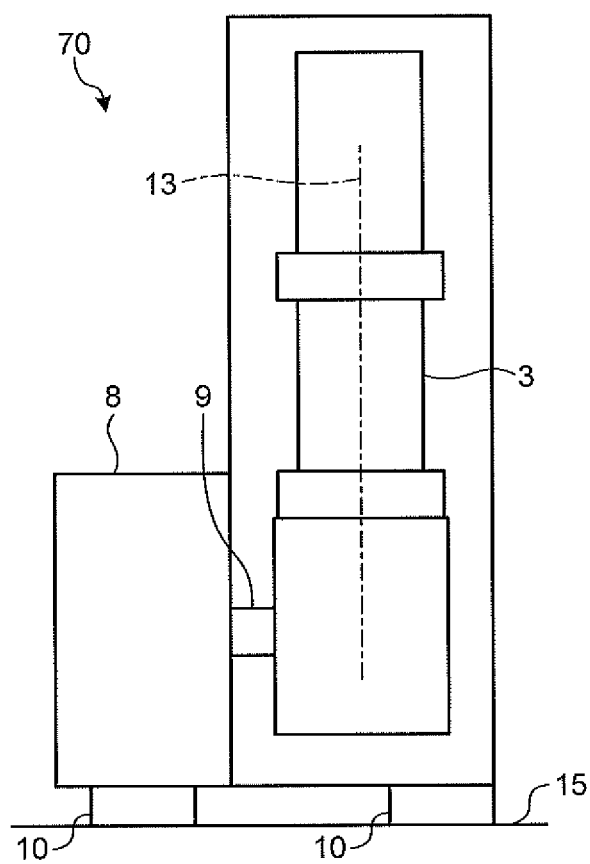
FIG. 4 is an arrow view taken along a line A-A in FIG. 3.

FIG. 3 is a front view of a schematic configuration of a circuit breaker according to a third embodiment of the present invention. FIG. 4 is an arrow view along a line A-A in FIG. 3. Internal configurations of the arc-extinguishing chambers 2 and 3 and an internal configuration of the operation device 8 are omitted in FIGS. 3 and 4. Constituent elements identical to those of the embodiments described above are denoted by like reference signs and detailed explanations thereof will be omitted.

In a circuit breaker 70 according to the third embodiment, the operation device 8 is arranged on a side of the connection conductor 4 and in a direction substantially perpendicular to the shaft line 12 of the first arc-extinguishing chamber 2 and the shaft line 13 of the second arc-extinguishing chamber 3 with respect to the connection conductor 4.

By applying such an arrangement, while the circuit breaker 70 has a larger size in a depth direction as compared to the arrangements described in the first or second embodiment, the circuit breaker 70 can be downsized both in horizontal and vertical directions.

INDUSTRIAL APPLICABILITY

As described above, the circuit breaker according to the present invention is useful as a circuit breaker including an arc-extinguishing chamber, and is particularly suitable for a double-break circuit breaker including two arc-extinguishing chambers.

REFERENCE SIGNS LIST 1 hermetic tank
2 first arc-extinguishing chamber
3 second arc-extinguishing chamber
4 connection conductor (connection unit)

5 first tank portion
6 second tank portion
7 connection tank portion
8 operation device
9 insulating operation rod
10 tank support leg
12, 13 shaft line
15 installation surface
16, 17 conductor
50, 60, 70 circuit breaker

The invention claimed is:

1. A circuit breaker comprising:
a first arc-extinguishing part including at least one arc-extinguishing chamber and a second arc-extinguishing part including at least one arc-extinguishing chamber, all of the arc-extinguishing chambers being connected serially and each of the arc-extinguishing chambers interrupting a current by simultaneously opening contact points within each of the arc-extinguishing chambers to extinguish an arc while the current is being interrupted in each arc-extinguishing chamber;
a connection unit that connects the first arc-extinguishing part and the second arc-extinguishing part to each other, and
a hermetic tank in which the first arc-extinguishing part, the second arc-extinguishing part, and the connection unit are accommodated, wherein
the first arc-extinguishing part and the second arc-extinguishing part are connected to the connection unit in such a manner that shaft lines of the first arc-extinguishing part and the second arc-extinguishing part form an angle of substantially 90 degrees, wherein
the first arc-extinguishing part is arranged on a side of the connection unit in such a manner that the shaft line thereof is substantially horizontal, and
the second arc-extinguishing part is arranged on an upper side of the connection unit in such a manner that the shaft line thereof is substantially vertical.

2. The circuit breaker according to claim 1, further comprising an operation device that performs an operation of interrupting a current flowing in the arc-extinguishing chambers of each of the first and second arc-extinguishing parts, wherein
the operation device is connected to a lower side of the connection unit.

3. The circuit breaker according to claim 1, further comprising an operation device that performs an operation of interrupting a current flowing in the arc-extinguishing chambers of each of the first and second arc-extinguishing parts, wherein
the operation device is provided on an opposite side of the first arc-extinguishing part sandwiching the connection unit and is connected to the connection unit.

4. The circuit breaker according to claim 1, further comprising an operation device that performs an operation of interrupting a current flowing in the arc-extinguishing chambers of each of the first and second arc-extinguishing parts, wherein
the operation device is provided in a direction substantially perpendicular to the shaft line of the first arc-extinguishing part and the shaft line of the second arc-extinguishing part with respect to the connection unit and is connected to the connection unit.

5. The circuit breaker according to claim 1, wherein shaft centers of the first arc-extinguishing part, the second arc-extinguishing part, and a conductor connected to the first arc-extinguishing part and the second arc-extinguishing part substantially coincide with a shaft center of the hermetic tank.

* * * * *